US012806568B2

(12) United States Patent
Nati et al.

(10) Patent No.: US 12,806,568 B2
(45) Date of Patent: Nov. 24, 2026

(54) WASTE PROCESSING METHOD AND SYSTEM

(71) Applicant: Cenagen Pty Ltd, Parramatta (AU)

(72) Inventors: Joseph Nati, Parramatta (AU); Vaniglio Brandimarte, Parramatta (AU); Pasquale Sergi, Parramatta (AU); Jason O'Sullivan, Parramatta (AU)

(73) Assignee: Cenagen Pty Ltd, Parramatta (AU)

( * ) Notice: Subject to any disclaimer, the term of this patent is extended or adjusted under 35 U.S.C. 154(b) by 0 days.

(21) Appl. No.: 19/333,110

(22) Filed: Sep. 18, 2025

(65) Prior Publication Data

US 2026/0014519 A1 Jan. 15, 2026

Related U.S. Application Data

(63) Continuation of application No. PCT/AU2024/050253, filed on Mar. 21, 2024.

(30) Foreign Application Priority Data

Mar. 21, 2023 (AU) ................................ 2023900784
Oct. 6, 2023 (AU) ................................ 2023903210

(51) Int. Cl.

| | |
|---|---|
| ***B01D 53/86*** | (2006.01) |
| ***A01G 9/18*** | (2006.01) |
| ***B09B 3/40*** | (2022.01) |
| ***B09B 3/50*** | (2022.01) |
| ***C01B 32/50*** | (2017.01) |

(52) U.S. Cl.

CPC ............. *B01D 53/864* (2013.01); *A01G 9/18* (2013.01); *B09B 3/40* (2022.01); *B09B 3/50* (2022.01); *C01B 32/50* (2017.08); *B01D 2256/22* (2013.01); *B01D 2257/502* (2013.01)

(58) Field of Classification Search

CPC .............. B01D 53/864; B01D 2256/22; B01D 2257/502; C01B 32/50; B09B 3/50; B09B 3/40; A01G 9/18

See application file for complete search history.

(56) References Cited

U.S. PATENT DOCUMENTS

| | | | | |
|---|---|---|---|---|
| 8,430,937 | B2 * | 4/2013 | Cheiky | C05F 17/60 44/628 |
| 2006/0124445 | A1 | 6/2006 | Labrecque et al. | |
| 2013/0011326 | A1 * | 1/2013 | Grover | C10K 1/30 423/437.1 |
| 2020/0048568 | A1 | 2/2020 | Carabin et al. | |
| 2021/0002568 | A1 * | 1/2021 | Delmas | C08B 37/0057 |
| 2021/0395159 | A1 * | 12/2021 | Bakshi | C05B 3/00 |
| 2022/0306464 | A1 | 9/2022 | Cruz et al. | |
| 2023/0114999 | A1 * | 4/2023 | Purola | C03B 37/022 423/650 |

FOREIGN PATENT DOCUMENTS

| | | | |
|---|---|---|---|
| CA | 2860280 | A1 | 7/2012 |
| GB | 2470452 | A | 11/2010 |
| JP | 2004057145 | A | 2/2004 |
| JP | 2007245124 | A | 9/2007 |
| JP | 6766908 | B2 | 9/2020 |
| KR | 102496595 | B1 | 2/2023 |
| WO | 2018051504 | A1 | 3/2018 |
| WO | 2021161020 | A1 | 8/2021 |

* cited by examiner

*Primary Examiner* — Stuart L Hendrickson

(74) *Attorney, Agent, or Firm* — MORRISON & FOERSTER LLP

(57) ABSTRACT

The present invention relates to a method including receiving a gas comprising at least carbon monoxide and hydrogen, separating the carbon monoxide from the hydrogen, converting at least a portion of the carbon monoxide into carbon dioxide, feeding the carbon dioxide into a greenhouse including plants.

19 Claims, 8 Drawing Sheets

WASTE PROCESSING METHOD AND SYSTEM

CROSS REFERENCE TO RELATED APPLICATIONS

This application is a continuation application of International Application No. PCT/AU2024/050253, filed internationally on 21 Mar. 2024, which claims the benefit of Australian Provisional Patent Application No. 2023900784, filed on 21 Mar. 2023, and Australian Provisional Patent Application No. 2023903210, filed on 6 Oct. 2023, the contents of all being incorporated herein by reference in their entirety.

FIELD OF THE INVENTION

The present disclosure is directed to waste processing methods and systems, methods of producing power, methods of producing methanol, and methods of growing plants including food. Preferably, one or more of these methods are integrated. In particular, the present disclosure is directed to methods and systems that may reduce the amount of greenhouse gases emitted into the atmosphere from processing waste and/or generate electrical power from processing waste.

BACKGROUND OF THE INVENTION

It is known that processing waste produces greenhouse gases. For example, organic waste produces methane as it decomposes and incinerating inorganic waste may produce several different greenhouse gases and other pollutants. Gasification, a non-combustion conversion of waste to gas, generates greenhouse gases including carbon monoxide (CO) and carbon dioxide ($CO_2$), which may be harmful to the environment or contribute to global warming. It will be appreciated that significant quantities of waste are processed daily around the globe, potentially resulting in substantial amounts of greenhouse gasses being emitted into the atmosphere and contributing to climate change. Accordingly, there is a need for methods and systems that may reduce the amount of greenhouse gases emitted into the atmosphere from processing waste.

SUMMARY OF THE INVENTION

The present invention provides a method including:

- receiving a gas comprising at least carbon monoxide and hydrogen
- separating the carbon monoxide from the hydrogen
- converting at least a portion of the carbon monoxide into carbon dioxide
- feeding the carbon dioxide into a greenhouse including plants and/or using the carbon dioxide to produce electricity.

In some embodiments, the gas is sourced from a plasma reactor, preferably a plasma arc reactor. Optionally, the reactor is not a bioreactor. Optionally, the reactor is not an incinerator. Optionally, the reactor is not for pyrolysis.

In some embodiments, the gas is sourced from the processing of waste. Alternatively, the invention provides a method for processing waste including:

- processing waste to generate a gas comprising at least carbon monoxide and hydrogen
- separating the carbon monoxide from the hydrogen

- converting at least a portion of the carbon monoxide into carbon dioxide
- feeding the carbon dioxide into a greenhouse including plants.

Optionally, the waste is one or more of municipal waste, industrial waste, hazardous waste, medical waste, construction waste, demolition waste, and biomass. Optionally, the waste is municipal waste, preferably solid municipal waste. Optionally, the municipal waste is shredded. Optionally, the solid waste is crushed. Optionally, the waste is a mix of waste sources. Optionally, the waste is not renewable or from a renewable source.

Optionally, the municipal waste includes asbestos, per- and polyfluoroalkyl substances (PFAS), or perfluorooctane sulfonic acid (PFOS) or related substances.

Optionally, the municipal waste or shredded municipal waste is processed in a gas generation process. Optionally, the gas generation process occurs in a reactor. Optionally, the gas generation process is gasification, incineration or thermal reaction. Optionally, the gas generation process is conducted in the presence of oxygen. Optionally, the gas generation process is not a biological synthesis process, that is, not a process using one or more microbe (such as one or more bacteria) to convert waste to gas. Optionally, the gas generation process is not pyrolysis, that is, not generated by heating in the absence of oxygen. Optionally, the gas generation process is not combustion. Optionally, the gas generation process is gasification or thermal reaction. Optionally, the gas generation process is gasification. Optionally, the gas generation process is not incineration. Optionally, the reactor is not an incinerator. Optionally, the reactor is a plasma reactor. Optionally, the reactor is not a bioreactor, that is, not a biodigestor or other reactor for using one or more microbe (such as one or more bacteria) to convert waste to gas. Optionally, the reactor is not a pyrolysis reactor, that is, for heating waste in the absence of oxygen. Optionally, the reactor is not a combustion reactor.

The present invention provides a method including:

- receiving a gas comprising at least carbon monoxide and hydrogen
- separating the carbon monoxide from the hydrogen
- converting at least a first portion of the carbon monoxide into carbon dioxide said conversion process resulting in a second portion of carbon monoxide remaining as carbon monoxide
- optionally the second portion of carbon monoxide is used in a heat exchange process that generates steam, a gas combustion process that generates power or a heat exchange process that generates steam followed by a gas combustion process that generates power
- feeding the carbon dioxide into a greenhouse including plants.

Optionally, the gas is synthetic gas. Optionally, the gas is not combustion exhaust. Optionally, the gas further comprises one or more of methane, carbon dioxide and hydrogen. Optionally, the gas is 25 to 50% v/v, 30 to 45% v/v or 35-40% v/v carbon monoxide. Optionally, the gas is 10 to 50% v/v, 15 to 45% v/v or 20 to 40% v/v hydrogen. Optionally, the gas further comprises 15 to 45% v/v, 20 to 40% v/v or 25 to 35% v/v carbon dioxide. Optionally, the gas comprises 0 to 20% v/v, 0 to 15% v/v or 1 to 15% v/v methane. Optionally, the gas further comprises 0 to 10% v/v, 1 to 8% v/v or 2 to 5% v/v nitrogen.

Following separation of the carbon monoxide from the gas, the carbon monoxide is optionally 90% to 100% v/v, >90 to 100% v/v, 95 to 100% v/v or 98 to 100% v/v pure.

Optionally, the gas includes carbon dioxide and the carbon dioxide is separated from the carbon monoxide and hydrogen. Optionally, the carbon dioxide separated from the gas is fed into the greenhouse including plants. Optionally, the carbon dioxide separated from the gas is combined with the carbon dioxide prepared from the carbon monoxide and the mixture fed into the greenhouse including plants. Optionally, the carbon dioxide separated from the gas is 90% to 100% v/v, >90 to 100% v/v, 95 to 100% v/v or 98 to 100% v/v pure. Optionally, the carbon dioxide is fed into the greenhouse in gas form. Optionally, the carbon dioxide gas contributes to heating of the greenhouse.

Optionally, the carbon monoxide is converted to carbon dioxide by catalytic conversion. Optionally, the carbon dioxide prepared from the carbon monoxide is 90% to 100% v/v, >90 to 100% v/v, 95 to 100% v/v or 98 to 100% v/v pure. Optionally, the carbon dioxide is cooled by water quenching before being fed into the greenhouse. Optionally, the carbon dioxide is cooled to 80° C. or less before feeding into the greenhouse. Optionally, the heat from the carbon dioxide at least in part maintains the temperature in the greenhouse.

Optionally, in the heat exchange process, the second portion of carbon monoxide provides heat for the conversion of water to steam. Optionally, in the heat exchange process, occurs in a heat exchanger.

Optionally, the steam generated by the heat exchange process is used to generate power. Optionally, the steam generated by the heat exchange process is fed to a steam power generator and used to generate power. Optionally, the steam generated by the heat exchange process drives a steam turbine, which is connected to and drives an electrical generator to generate electrical power.

Optionally, the gas combustion process occurs in a gas combustion generator.

Optionally, emissions from the gas combustion process or gas combustion generator are fed into the reactor generating the gas. Optionally, there are noxious gases in the gas and the noxious gases are separated from the carbon monoxide, hydrogen, optional nitrogen and other gases. Optionally, the separated noxious gases are returned to the reactor.

Optionally, the power generated from the gas combustion process/gas combustion generator and/or steam generation process/steam power generator is fed to a substation. Optionally, the substation feeds power to the grid.

Optionally, water from a water reservoir is fed into the heat exchanger.

Optionally, steam power generator produces water/steam and the water/steam is stored in a water reservoir.

Optionally, there is a control system controlling one or more of the waste processing such as shredding, the greenhouse operation and the substation.

Optionally, at least a portion of the hydrogen and/or nitrogen separated from the gas in the gas separation process is fed back into the reactor.

Optionally, the reactor is an argon plasma reactor and argon is fed into the argon plasma reactor.

Optionally, the plants are plants capable of photosynthesis. Optionally, the plants capable of photosynthesis are edible or food sources.

Optionally, the method occurs at a single site controlled by a single control system.

Optionally, power received by the substation is used to power one or more of the (i) waste shredder; (ii) argon production; and (ii) the greenhouse; and the grid.

Optionally, the carbon dioxide separated from the gas or converted from the carbon monoxide that is not fed into the greenhouse is converted to methanol and/or fed to a fuel gas generator.

In another aspect, the invention provides a waste processing system comprising:

- a gas separator configured to receive gas including carbon monoxide and other gases, the gas separator configured to separate the carbon monoxide and the other gases;
- a carbon dioxide production unit configured to receive a first portion of the separated carbon monoxide and convert the first portion of the separated carbon monoxide to carbon dioxide; and
- a greenhouse configured to receive the carbon dioxide, wherein plants are grown in the greenhouse.

In some embodiments, the waste processing system further comprises a heat exchanger configured to receive a second portion of the separated carbon monoxide, wherein the heat exchanger is configured to generate steam using the second portion of the separated carbon monoxide.

In some embodiments, the waste processing system further comprises a gas combustion generator configured to receive a first part of the second portion of the separated carbon monoxide flowing out of the heat exchanger, wherein the gas combustion generator is configured to combust the first part of the second portion of the separated carbon monoxide to generate electrical power.

In some embodiments, the waste processing system further comprises a steam power generator configured to generate electrical power using the steam generated by the heat exchanger.

In some embodiments, the waste processing system further comprises a methanol production plant configured to receive a second part of the second portion of the separated carbon monoxide flowing out of the heat exchanger, wherein the methanol production plant is configured to produce methanol using the second part of the second portion of the separated carbon monoxide.

In some embodiments, the waste processing system further comprises a waste conversion unit configured to receive waste material and produce the gas from the waste material. In some embodiments, the waste conversion unit is a plasma arc reactor.

In some embodiments, the waste processing system further comprises a source of argon configured to provide argon to the plasma arc reactor.

In some embodiments, the gas combustion generator is in fluid communication with the waste conversion unit and gas emissions from the gas combustion generator are configured to flow from the gas combustion generator into the waste conversion unit.

In some embodiments, the gas separator is in fluid communication with the waste conversion unit and the separated other gases are configured to flow from the gas separator into the waste conversion unit.

In some embodiments, the waste processing system further comprises a waste shredder configured to shred solid waste to produce the waste material.

BRIEF DESCRIPTION OF THE DRAWINGS

Preferred embodiments of the invention will be described, by way of examples only, with reference to the accompanying representations.

DETAILED DESCRIPTION OF THE EMBODIMENTS

Definitions

Figure 1:
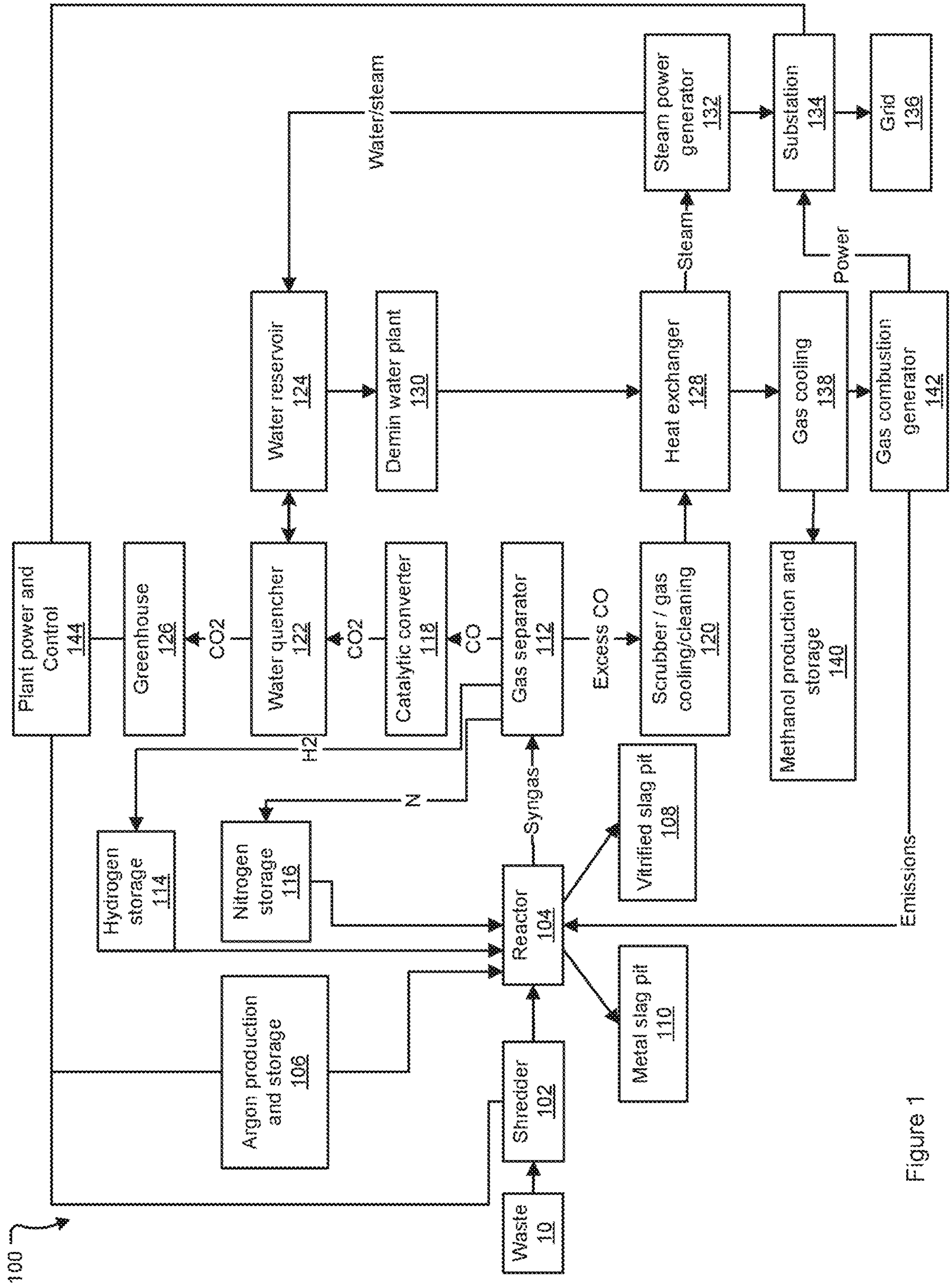
FIG. 1 is a schematic of a waste processing system according to a first embodiment of the present disclosure.

For purposes of interpreting this specification, terms used in the singular will also include the plural and vice versa.

"About" as used herein when referring to a measurable value such as an amount, a temporal duration, and the like, is meant to encompass variations of ±20% or ±10%, in some instances ±5%, in some instances ±1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Waste

Waste streams may be selected for compatibility with this process. Suitable waste streams may include one or more of municipal solid waste, hazardous industrial waste, medical waste, biomass, and combinations thereof.

Municipal solid waste may also be defined as trash or garbage and consists of everyday items that are used and then disposed of. This may include items such as product packaging, grass clippings, furniture, clothing, bottles, food scraps, newspapers, appliances, paint and batteries. This waste stream may come from homes, schools and businesses.

Hazardous industrial waste is waste produced by industrial activity which includes any material that is rendered useless during a manufacturing process such as that of factories, businesses, mills and mining operations. This waste may be harmful to the environment or humans. This may include items such as plastics, glass, asbestos, chemical waste and unprocessed used cooking fats and oils. This waste may be in solid or liquid form.

Medical waste is waste produced from medical facilities, for example hospitals, dental surgeries, veterinary clinics and laboratories. This waste may include items such as sharps (syringes and needles), biological specimens or cultures and waste from patients with contagious diseases.

Biomass is renewable organic material that comes from plants and/or animals. This waste may include wood, wood residues, energy crops, agricultural residues and organic waste from industry or households.

Optionally, the waste is biomass. Alternatively, the waste is not biomass.

Optionally, the waste is not renewable.

Plasma Gasification

Plasma gasification is a thermal process using plasma which converts organic matter into a syngas (synthesis gas) primarily made up of hydrogen and carbon monoxide (CO). Typically, a plasma torch powered by an electric arc is used to ionize gas and catalyze organic matter into syngas and slag. This process usually occurs in the presence of air including oxygen. The person skilled in the art would be aware of the various methods by which plasma gasification can be carried out. In particular, they would be aware of the various inert gases (eg argon or nitrogen) that could be used, as well as the variety of electrodes (eg copper, tungsten, hafnium or zirconium) possible. The person skilled in the art would also be aware that the temperature of the plasma reaction would determine the structure of the plasma and forming gas.

One potential by-product of plasma gasification is slag, which may contain inorganic compounds in the waste stream that are not broken down by plasma gasification. These compounds are melted and may include metals, glass and ceramics. Metals may further be recovered from the slag.

Synthesis gas or syngas consists predominantly of carbon monoxide and hydrogen in the gas stream. Other minor components such as carbon dioxide, methane and nitrogen may also be present in the gas stream.

Gas Cleaning

The person skilled in the art would be aware of the various techniques known in the art for cleaning gas streams and/or separating component gases. Techniques which could be used with the present disclosure may include any one or more of gas scrubbing, pressure swing adsorption, vacuum swing adsorption, temperature swing adsorption, cryogenic distillation and membrane separation. For example, hydrogen may be separated from produced $CO_2$ by pressure swing adsorption, amine scrubbing and membrane separation. Other gas cleaning techniques that are known in the art are contemplated.

A further gas cleaning step may comprise passing the gas through a secondary plasma arc.

Heat Exchangers

A heat exchanger is a system used to transfer heat between a source and a working fluid and can be used in both heating and cooling processes. The person skilled in the art would be aware of the various configurations known in the art for heat exchangers, for example double pipe heat exchangers, shell-and-tube heat exchangers, plate heat exchangers, condensers and boilers, and heat sinks. Other configurations known in the art are contemplated.

Catalytic Conversion

Catalytic conversion is a process by which the product(s) obtained by a process are converted into other product(s) though the use of a catalyst. The person skilled in the art would be aware of the many catalytic conversion processes that are known in the art, for example Fisher-Tropsch synthesis (to convert syngas into liquid hydrocarbons), methanol production and ammonia production. Other potential catalytic conversion processes known in the art are contemplated. The person skilled in the art would be able to determine suitable catalysts and conditions to produce various products from syngas streams.

Conversion of CO to $CO_2$

Methods of converting CO to $CO_2$ are known in the art and are contemplated. The person skilled in the art would be aware of methods suitable for use in the present invention. For example, methods include catalytic conversion using metal catalysts (eg platinum).

An additional method of converting CO to $CO_2$ may be the water gas shift reaction (reaction equation below). This may also be used in the present invention to increase the proportion of hydrogen present in a syngas mixture.

$$CO + H_2O \longrightarrow CO_2 + H_2$$

Methanol Production from CO and $CO_2$

Both the carbon monoxide and carbon dioxide gas from the gas stream of the present invention may be converted to methanol during the process. The person skilled in the art would be aware of the various methods by which this is possible.

In the conventional commercial processes, methanol is produced from carbon monoxide and hydrogen gas using catalytic conversion. Examples of suitable catalysts include those based on copper, zinc oxide and alumina ($Cu/ZnO/Al_2O_3$) systems, although the person skilled in the art would be able to determine other suitable catalysts. Catalysts may be heterogeneous or homogeneous catalysts.

Carbon dioxide may also produce methanol through a catalytic conversion process. The person skilled in the art would be aware of systems capable of achieving this transformation. For example, solid metal catalysts or molecular catalysts (eg organometallic catalysts and/or organocatalysts). Catalysts may be heterogeneous or homogenous catalysts.

The production of methanol may also be achieved using a mixture of carbon monoxide and carbon dioxide with hydrogen gas. The person skilled in the art would be aware of the various methods by which this is achievable, including for example, catalysts based on copper, zinc oxide and alumina ($Cu/ZnO/Al_2O_3$) systems.

Description of the Figures

FIG. 1 shows a waste processing system 100 according to an embodiment of the present disclosure. The system 100 has a waste shredder 102 configured to receive waste 10. The waste 10 may include one or more of municipal solid waste, hazardous industrial waste, medical waste, biomass, and combinations thereof. The waste shredder 102 is configured to shred the waste 10 to reduce the volume of the waste 10, which may allow for more efficient processing of the shredded waste material produced from the waste shredder 102.

The shredded waste from the waste shredder 102 is fed into a plasma arc reactor 104. The plasma arc reactor 104 may have two chutes (not shown), one through which solid components of the shredded waste may be introduced into the plasma arc reactor 104 and another through which liquid components of the shredded waste may be introduced into the plasma arc reactor 104. However, it also envisaged that the plasma arc reactor 104 may have a single chute (not shown) through which all the shredded waste (including the liquid and solid components) may be fed into the plasma arc reactor 104.

The plasma arc reactor 104 is configured to process the shredded waste at high temperatures. The plasma arc reactor 104 is coupled in fluid communication with an argon production and storage plant 106. The argon production and storage plant 106 is configured to produce argon using any suitable method known in the art and store the produced argon. The argon production and storage plant 106 is also configured to provide argon to the plasma arc reactor 106 to produce argon plasma.

The argon plasma produced in the plasma arc reactor 106 is used to convert the shredded waste in the plasma arc reactor 104. Based on the composition of the shredded waste, some of the shredded waste may melt and some of the shredded waste may vaporise. Depending on the composition of the shredded waste, converting the shredded waste with the argon plasma may produce two layers of slag, a first layer of vitrified slag and a second layer of metal slag. The vitrified slag may be suitable for use as aggregate for concrete and/or asphalt depending on the composition of the vitrified slag. The metal slag may include iron, aluminium, precious metals, and/or other metals depending on the composition of the shredded waste introduced into the plasma arc reactor 104.

The plasma arc reactor 104 has two ports (not shown), one port for drawing off the first layer of vitrified slag into a slag pit 108 and a second port for drawing off the second layer of metal slag into a metal slag pit 110. The metal slag pit 110 may form the metal slag into metal ingots.

Converting the shredded waste with argon plasma in the plasma arc reactor 104 also produces high temperature synthetic gas. The synthetic gas may comprise carbon monoxide (CO) gas, hydrogen ($H_2$) gas, nitrogen gas, and other gases.

The plasma arc reactor 104 is coupled in fluid communication with a gas separator 112. The high temperature synthetic gas produced in the plasma arc reactor 104 is introduced into the gas separator 112, which is configured to separate the synthetic gas into its constituent component gases. In particular, the gas separator 112 is configured to separate the synthetic gas into CO gas, $H_2$ gas, N gas, and other gases. Any suitable gas separator that is known in the art may be used for the gas separator 112.

The gas separator 112 is coupled in fluid communication with a hydrogen storage plant 114, a nitrogen storage plant 116, a catalytic converter 118, and a gas cooling/cleaning system 120. $H_2$ and N gas separated at the gas separator 112 is stored at the hydrogen storage plant 114 and the nitrogen storage plant 116, respectively. The hydrogen storage plant 114 and the nitrogen storage plant 116 are coupled in fluid communication with the plasma arc reactor 104 and are configured to supply $H_2$ gas and N gas to the plasma arc reactor 104, respectively.

CO gas separated at the gas separator 112 is fed into the catalytic converter 118. The catalytic converter 118 is configured to convert the CO gas to carbon dioxide ($CO_2$) gas.

The catalytic converter 118 is coupled in fluid communication with a water quencher 122. The water quencher 122 is coupled in fluid communication with a water reservoir 124 and is configured to reduce the temperature of the $CO_2$ gas from the catalytic converter 118 using water from the water reservoir 124.

The water quencher 122 is coupled in fluid communication with a greenhouse 126. The greenhouse 126 is configured to receive the $CO_2$ gas cooled by the water quencher 122. The water quencher 122 is configured to cool the $CO_2$ gas to a temperature that is suitable for use in the greenhouse 126.

Depending on the size of the greenhouse 126 and the plants, specifically plants capable of photosynthesis, being grown in the greenhouse 126, an optimal amount of $CO_2$ should be introduced into the greenhouse 126. The amount of CO gas produced in the plasma arc reactor 104 may be greater than the amount required to produce the optimal amount of $CO_2$ for the greenhouse 126. In this case, there will be excess CO gas that is not required for producing $CO_2$ for the greenhouse 126. When there is excess CO gas produced in the plasma reactor 104, after the CO gas has been separated at the gas separator 112, the excess CO gas is sent from the gas separator 112 to the cooling/cleaning system 120.

The cooling/cleaning system 120 is configured to clean and cool the CO gas received from the gas separator 112. The cooling/cleaning system 120 may be a water quencher. The CO gas received from the gas separator 112 may pass through a chamber of the water quencher where the CO gas may be sprayed with cold water to cool the CO gas. This process may also remove particulate matter that may be present in the CO gas. Any particulate matter removed from the CO gas in the water quencher may be returned to the plasma arc reactor 104 for further processing.

It will be appreciated that the CO gas produced in the plasma arc reactor 104 will have a significantly high temperature. By the time the excess CO gas has passed through the gas separator 112 and the cooling/cleaning system 120, the temperature of the cooled CO gas exiting the cooling/cleaning system 120 may still be relatively high.

The cooling/cleaning system 120 is coupled in fluid communication with a heat exchanger 128. The heat exchanger 128 is coupled in fluid communication with a demineralised water plant 130, which is coupled in fluid communication with the water reservoir 124. The demineralised water plant 130 is configured to demineralise water from the water reservoir 124 before it passes through the heat exchanger 128.

The cooled CO gas exiting the cooling/cleaning system 120 is configured to pass through the heat exchanger 128, which heats water passing through heat exchanger 128 to produce steam.

The heat exchanger 128 is coupled in fluid communication with a steam power generator 132 (e.g. a steam turbine generator). The steam produced by the heat exchanger 128 is delivered to the steam power generator 132, which uses the steam to produce electrical power. The steam power generator 132 is electrically coupled to a substation 134, which is electrically connected to an electrical grid 136 (e.g. mains electricity). The substation 134 is configured to transform the electrical power generated by the steam power generator 132 to electrical power suitable for the electrical grid 136. For example, if the substation 134 is electrically connected to a distribution network, the substation 134 may be configured to transform the electrical power generated by the steam power generator 132 to electrical power having a voltage of 415V or 66 kV. Alternatively, if the substation 134 is electrically connected to a transmission network, the substation 134 may be configured to transform the electrical power generated by the steam power generator 132 to electrical power having a voltage of 132 kV or 275 kV.

The steam power generator 132 is also coupled in fluid communication with the water reservoir 124 so that steam/water flowing out of the steam power generator 132 may be returned to the water reservoir 124.

The heat exchanger 128 is also coupled in fluid communication with a gas cooling system 138. The CO gas flowing out of the heat exchanger 128 is passed through the gas cooling system 138 to reduce the temperature of the CO gas. The gas cooling system 128 is coupled in fluid communication with a methanol production and storage plant 140 and a gas combustion generator 142. Cooled CO gas flowing out of the gas cooling system 138 may be directed to the methanol production and storage plant 140 or the gas combustion generator 142.

The methanol production and storage plant 140 is configured to produce methanol from cooled CO gas flowing out of the gas cooling system 138 using any suitable method known in the art.

The gas combustion generator 142 is configured to combust cooled CO gas flowing out of the gas cooling system 138 to produce electrical power. The gas combustion generator may be a gas turbine or a reciprocating gas engine. The gas combustion generator 142 is electrically connected to the substation 134 such that power generated by the gas combustion generator 142 is delivered to the substation 134.

In an embodiment, the priority may be to send the cooled CO gas flowing out of the gas cooling system 138 to the combustion power generator 142. In this example, the combustion power generator 142 may be required to generate a particular power output, which may require a particular amount/flow rate of CO gas to be provided to the combustion power generator 142. If the amount/flow rate of CO gas flowing out of the gas cooling system 138 is greater than the amount required for the combustion power generator 142 to generate the particular power output, the excess CO gas may be directed to the methanol production and storage plant 140 to produce methanol.

The gas combustion generator 142 is coupled in fluid communication with the plasma arc reactor 104 such that combustion gas emissions from the gas combustion generator 142 are delivered into the plasma arc reactor 104.

The system 100 also includes a controller 144 in operative communication with the shredder 102, the argon production and storage plant 106, the greenhouse 126, and the substation 134. The controller 144 may be in operative communication with each of the shredder 102, argon production and storage plant 106, greenhouse 126, and substation 134 via a physical wired connection and/or via a wireless connection (e.g. internet, wide area network, local area network).

The controller 144 is configured to control one or more operations of the shredder 102, argon production and storage plant 106, greenhouse 126, and substation 134. For example, the controller 144 may be configured to direct electrical power from the substation 134 to the shredder 102 in order to power the shredder 102. In this example, the substation 134 would be electrically connected to the shredder 102. It is also envisaged that the controller 144 could be configured to direct power from the substation 134 to any of the other components of the system 100 and that, in this case, those components would also be electrically connected to the substation 134. It is also envisaged that the controller 144 may be in operative communication with other components of the system 100 and be configured to control one or more operations of those components.

The waste processing system 100 therefore uses the CO gas produced in the plasma arc reactor 104 to produce $CO_2$ gas, which will be absorbed by flora growing in the greenhouse 126. If more CO gas is produced from the plasma arc reactor 104 than is required to produce an optimal amount of $CO_2$ gas for the greenhouse 126, the excess CO gas may be used to produce steam for electricity production, produce methanol, and/or combusted in a gas combustion generator for electricity production. Other gases produced in the plasma arc reactor 104 and the gas emissions from the gas combustion generator 142 are recycled back into the plasma arc reactor 104 for further processing. Accordingly, it will be appreciated that the waste processing system 100 may reduce the amount of gases (including greenhouse gases) emitted into the atmosphere from processing the waste 10.

Although the waste processing system 100 has been described and illustrated having a plasma arc reactor 104 configured to generate argon plasma, it will be appreciated that the plasma arc reactor 104 may be configured to generate argon plasma, hydrogen plasma, and/or nitrogen plasma. In such an embodiment, the plasma arc reactor 104 may receive argon from the argon production and storage plant 106 to produce argon plasma, hydrogen gas separated at the gas separator 112 to produce hydrogen plasma, and/or nitrogen gas separated at the gas separator 112 to produce nitrogen plasma. In embodiments where the plasma arc reactor 104 is configured to generate hydrogen and/or nitrogen plasma but is not configured to generate argon plasma, the waste processing system 100 may not include the argon production and storage plant 106.

Figure 2:
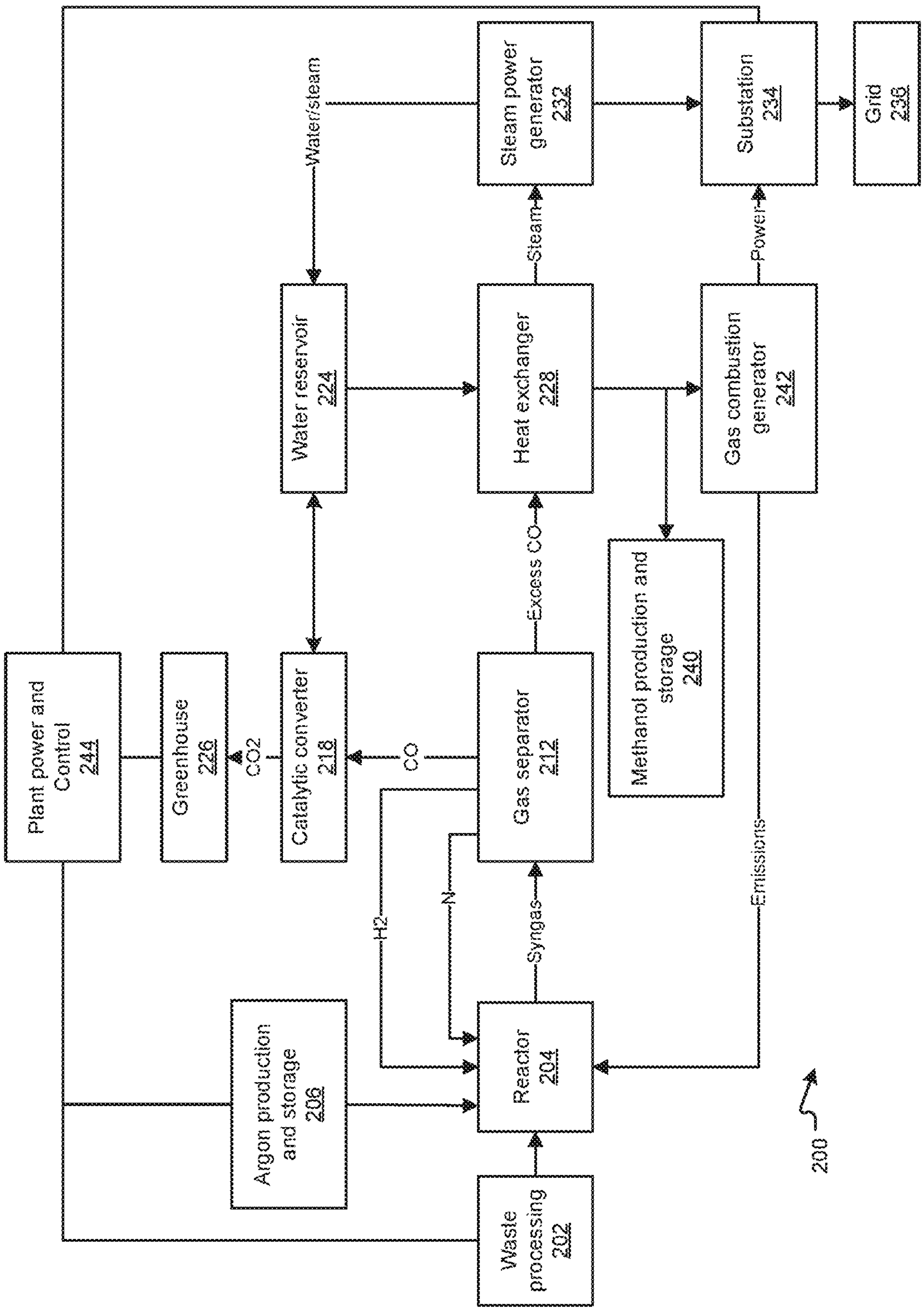
FIG. 2 is a schematic of a waste processing system according to a second embodiment of the present disclosure.

FIG. 2 is a waste processing system 200 according to another embodiment of the present disclosure. The waste processing system 200 is similar to the waste processing system 100 except that the hydrogen storage 114, nitrogen storage 116, vitrified slag pit 108, metal slag pit 110, water quencher 122, cooling/cleaning system 120, demineralised water plant 130, and gas cooling system 138 of waste processing system 100 are not included in the waste processing system 200. Features of the waste processing system 200 that are identical or equivalent to those of the waste processing system 100 are provided with reference numerals that are equivalent to those of the waste processing system 100 but incremented by 100. Accordingly, it will be appreciate that the waste processing system 200 operates in a similar manner to that described above with respect to waste processing system 100.

Figure 3:
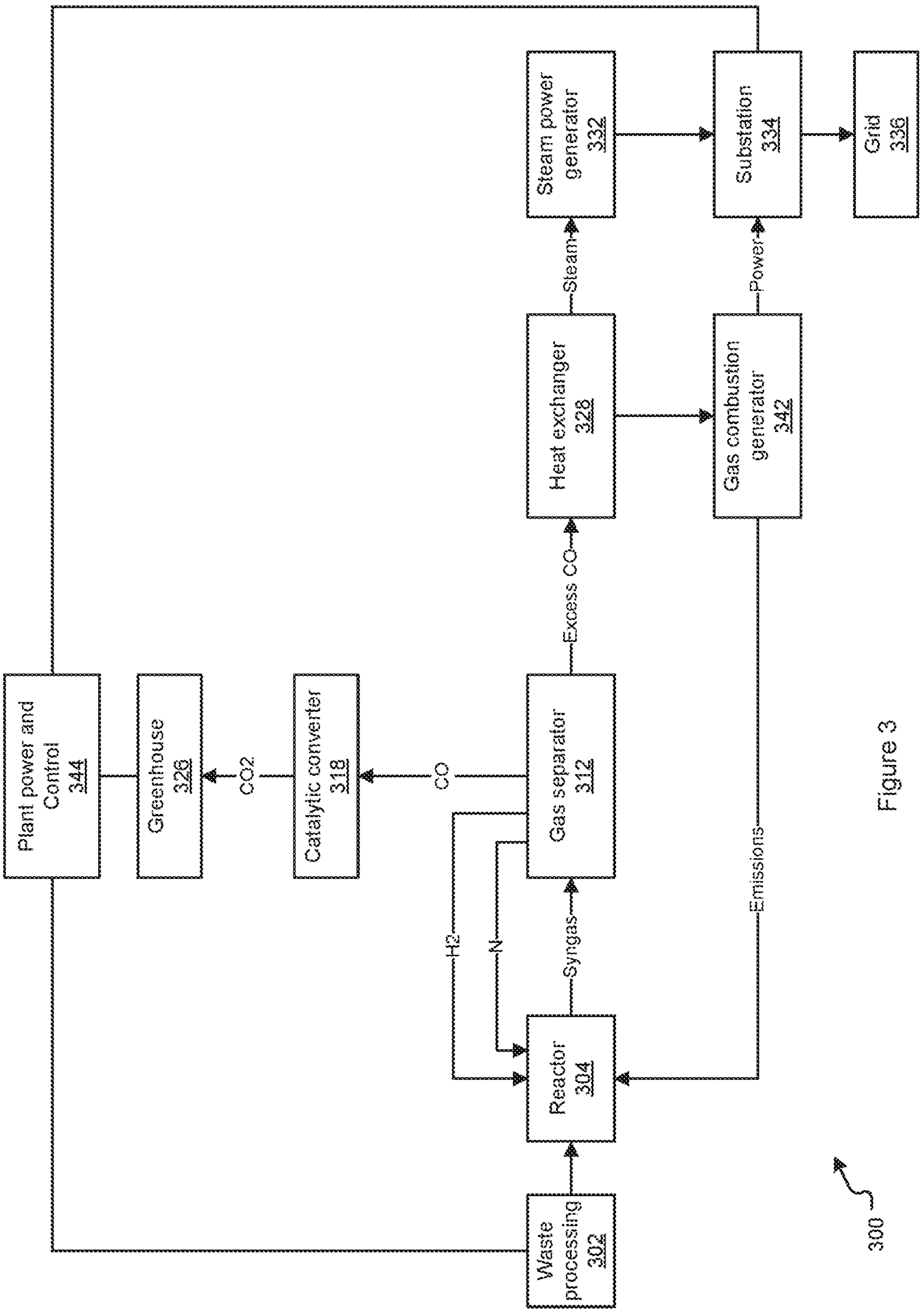
FIG. 3 is a schematic of a waste processing system according to a third embodiment of the present disclosure

FIG. 3 is a waste processing system 300 according to another embodiment of the present disclosure. The waste processing system 300 is similar to the waste processing system 200 except that the argon production and storage plant 206, the water reservoir 224, and the methanol production and storage plant 240 of waste processing system 200 are not included in the waste processing system 300. Features of the waste processing system 300 that are identical or equivalent to those of the waste processing system 100 are provided with reference numerals that are equivalent to those of the waste processing system 100 but incremented by 200. Accordingly, it will be appreciate that the waste processing system 300 operates in a similar manner to that described above with respect to waste processing system 100.

Figure 4:
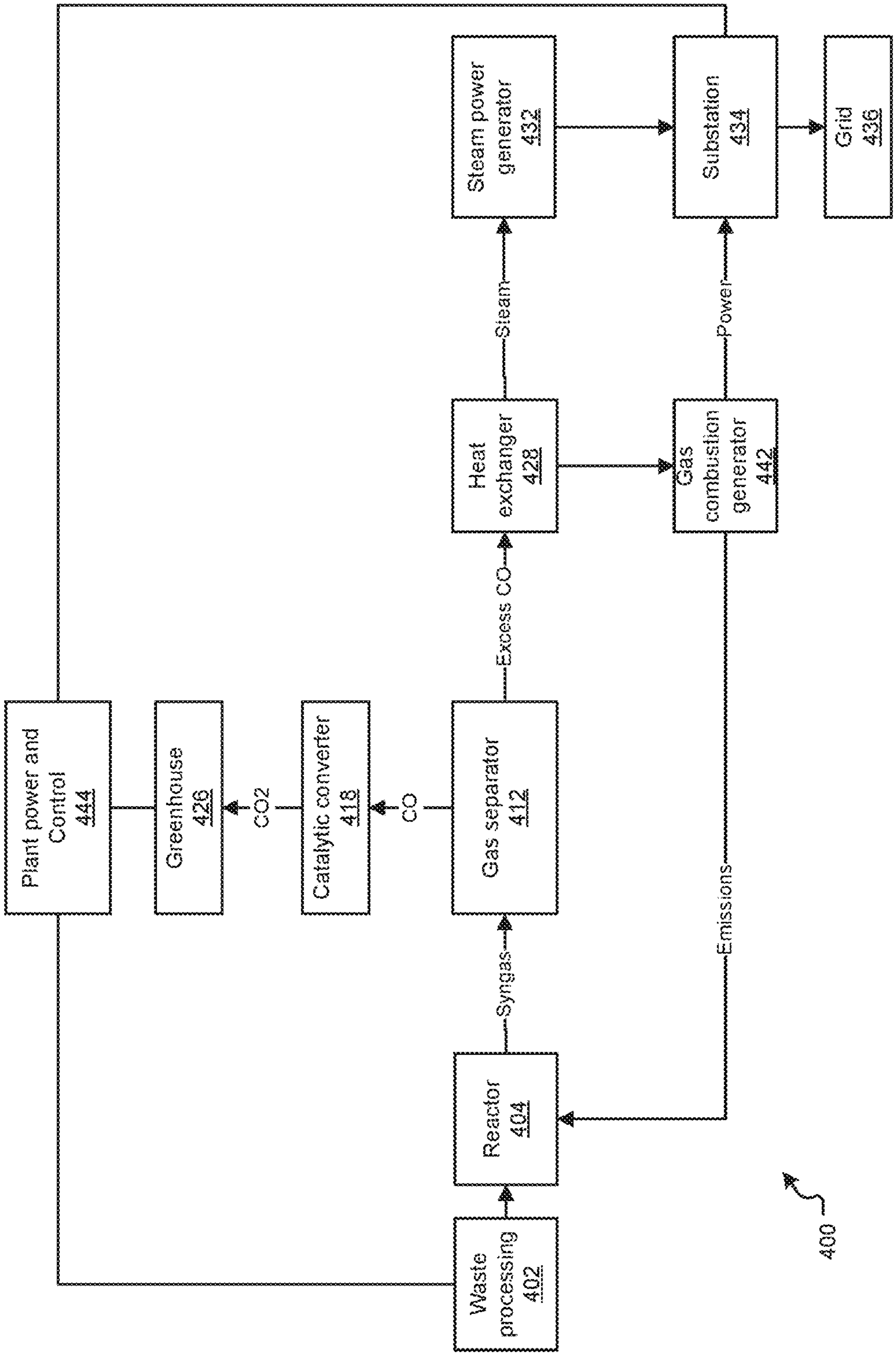
FIG. 4 is a schematic of a waste processing system according to a fourth embodiment of the present disclosure.

FIG. 4 is a waste processing system 400 according to another embodiment of the present disclosure. The waste processing system 400 is similar to the waste processing system 300 except that $H_2$ and N gases produced in the plasma arc reactor 404 are not recycled back into the plasma arc reactor 404 from the gas separator 412 as in waste processing system 300. Features of the waste processing system 400 that are identical or equivalent to those of the waste processing system 100 are provided with reference numerals that are equivalent to those of the waste processing system 100 but incremented by 300. Accordingly, it will be appreciate that the waste processing system 400 operates in a similar manner to that described above with respect to waste processing system 100.

Figure 5:
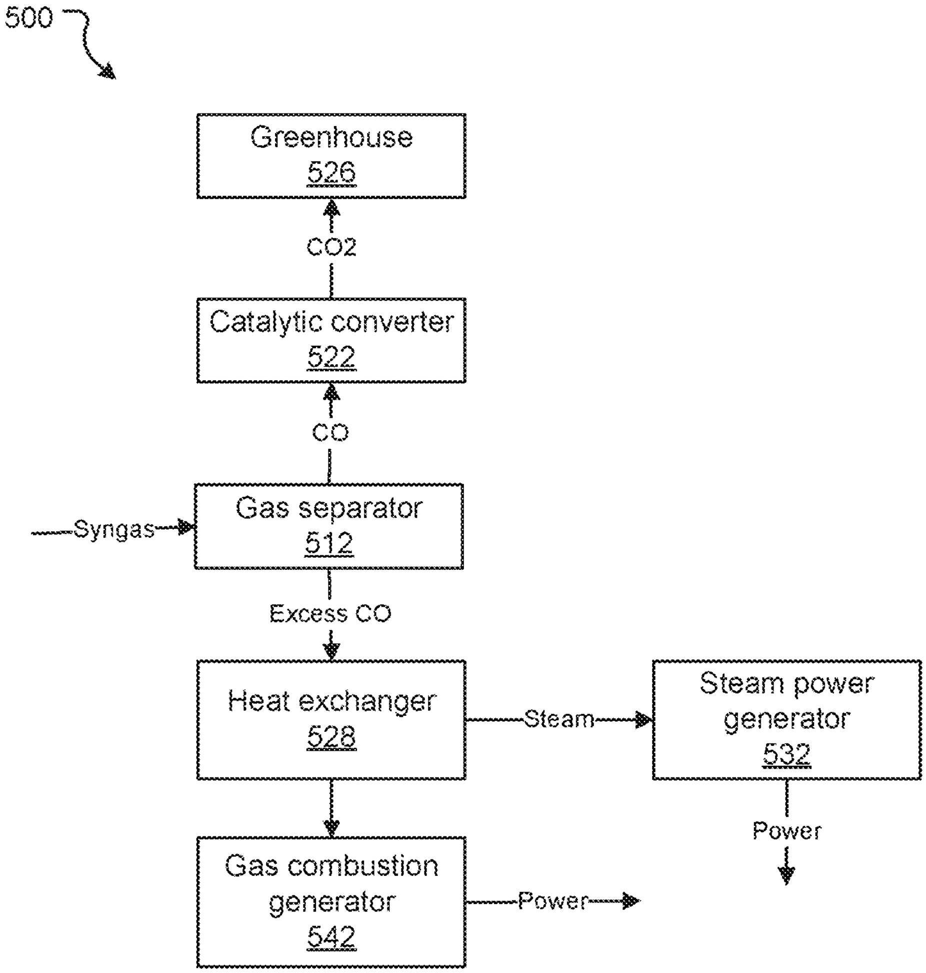
FIG. 5 is a system for processing synthetic gas according to a fifth embodiment of the present disclosure.

FIG. 5 shows a system 500 for processing synthetic gas. The synthetic gas may be produced in a plasma arc reactor (e.g. plasma arc reactor 104) that is burning municipal solid waste. The synthetic gas may be processed in a similar manner to that described above with respect to waste processing system 100 to produce $CO_2$ gas for a greenhouse (e.g. greenhouse 126), produce steam for electricity production from CO gas, and/or combust CO gas in a gas combustion generator (e.g. gas combustion generator 142) for electricity production. Features of the system 500 that are identical or equivalent to those of the waste processing system 100 are provided with reference numerals that are equivalent to those of the waste processing system 100 but incremented by 400.

Figure 6:
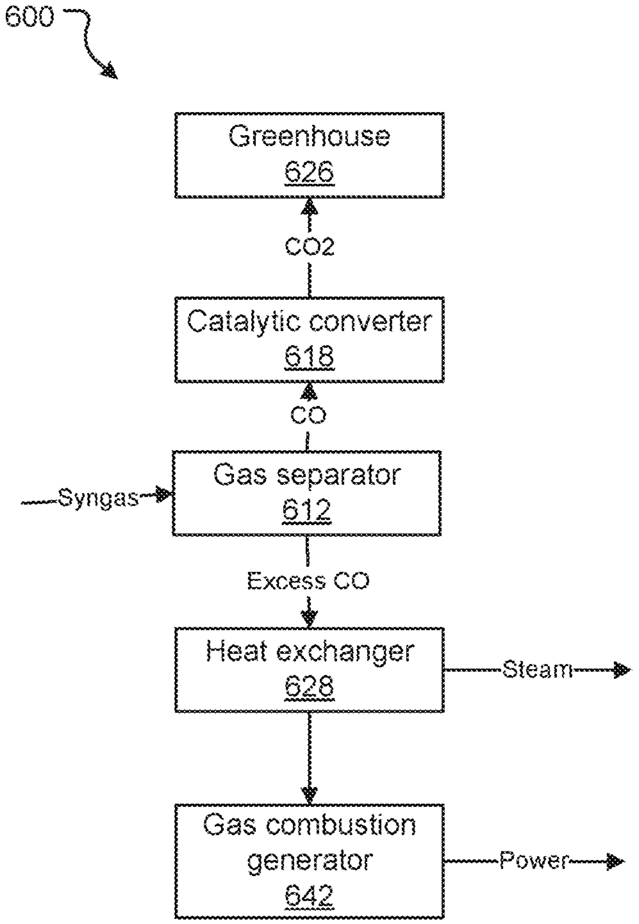
FIG. 6 is a system for processing synthetic gas according to a sixth embodiment of the present disclosure.

FIG. 6 shows a system 600 for processing synthetic gas. The system 600 is similar to system 500 but does not include the steam power generator 532 of system 500. Features of the system 600 that are identical or equivalent to those of the system 500 are provided with reference numerals that are equivalent to those of the system 500 but incremented by 100. Accordingly, it will be appreciate that the system 600 operates in a similar manner to that of system 500.

Figure 7:
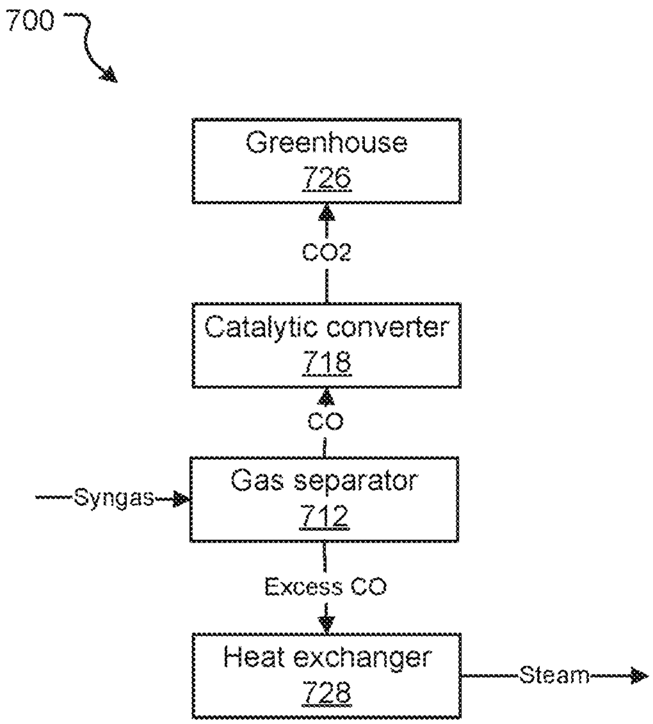
FIG. 7 is a system for processing synthetic gas according to a seventh embodiment of the present disclosure.

FIG. 7 shows a system 700 for processing synthetic gas. The system 700 is similar to system 600 but does not include the gas combustion generator 642 of system 600. Features of the system 700 that are identical or equivalent to those of the system 500 are provided with reference numerals that are equivalent to those of the system 500 but incremented by 200. Accordingly, it will be appreciate that the system 700 operates in a similar manner to that of system 500.

Figure 8:
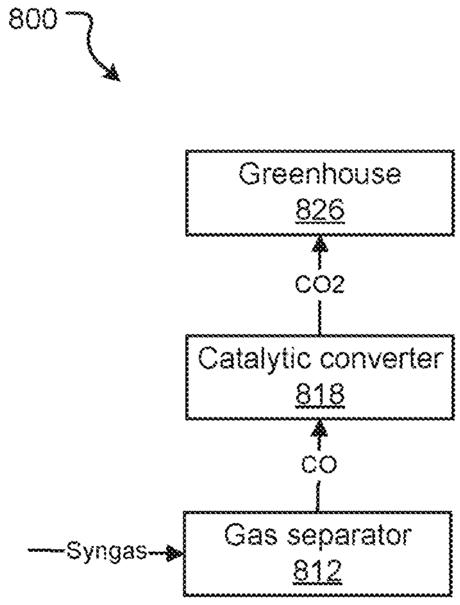
FIG. 8 is a system for processing synthetic gas according to an eighth embodiment of the present disclosure.

FIG. 8 shows a system 800 for processing synthetic gas. The system 800 is similar to system 700 but does not include the heat exchanger 728 of system 700. Features of the system 800 that are identical or equivalent to those of the system 500 are provided with reference numerals that are equivalent to those of the system 500 but incremented by 300. Accordingly, it will be appreciate that the system 800 operates in a similar manner to that that of system 500.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

By way of clarification and for avoidance of doubt, as used herein and except where the context requires otherwise, the term "comprise" and variations of the term, such as "comprising", "comprises" and "comprised", are not intended to exclude further additions, components, integers or steps.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A waste processing system comprising:

a gas separator configured to receive gas, the gas separator configured to separate the gas into one or more constituent component gases comprising at least carbon monoxide;

a carbon dioxide production unit configured to receive a first portion of the separated carbon monoxide and convert the first portion of the separated carbon monoxide to carbon dioxide;

a greenhouse configured to receive the carbon dioxide, wherein plants are grown in the greenhouse;

a waste conversion unit configured to receive waste material and produce the gas from the waste material, wherein the waste conversion unit is a plasma reactor or a gasification, incineration, or thermal reactor; and a heat exchanger configured to receive a second portion of the separated carbon monoxide, wherein the heat exchanger is configured to generate steam using the second portion of the separated carbon monoxide.

2. The waste processing system of claim 1, further comprising a gas combustion generator configured to receive a first part of the second portion of the separated carbon monoxide flowing out of the heat exchanger, wherein the gas combustion generator is configured to combust the first part of the second portion of the separated carbon monoxide to generate electrical power.

3. The waste processing system of claim 1, further comprising a steam power generator configured to generate electrical power using the steam generated by the heat exchanger.

4. The waste processing system of claim 1, further comprising a methanol production plant configured to receive a second part of the second portion of the separated carbon monoxide flowing out of the heat exchanger, wherein the methanol production plant is configured to produce methanol using the second part of the second portion of the separated carbon monoxide.

5. The waste processing system of claim 1, further comprising a source of argon configured to provide argon to the plasma reactor.

6. The waste processing system of claim 2, wherein the gas combustion generator is in fluid communication with the waste conversion unit and gas emissions from the gas combustion generator are configured to flow from the gas combustion generator into the waste conversion unit.

7. The waste processing system of claim 1, wherein the gas separator is in fluid communication with the waste conversion unit and the separated other gases are configured to flow from the gas separator into the waste conversion unit.

8. The waste processing system of claim 1, further comprising a waste shredder configured to shred solid waste to produce the waste material.

9. The waste processing system of claim 1, wherein the plasma reactor is a plasma arc reactor.

10. The waste processing system of claim 1, wherein the waste is one or more of municipal waste, industrial waste, hazardous waste, medical waste, construction waste, demolition waste, and biomass.

11. The waste processing system of claim 1, wherein the reactor is a gasification reactor.

12. The waste processing system of claim 1, wherein the gas further comprises one or more of methane, carbon dioxide, and hydrogen.

13. The waste processing system of claim 1, wherein the gas further comprises carbon dioxide and hydrogen.

14. The waste processing system of claim 1, wherein the gas further comprises 25 to 50% v/v carbon monoxide, and 20 to 40% v/v hydrogen.

15. The waste processing system of claim 14, wherein the gas further comprises 15 to 45% v/v carbon dioxide, 0 to 20% v/v methane, and 0 to 10% v/v nitrogen.

16. The waste processing system of claim 1, wherein the carbon dioxide production unit comprises a catalytic converter and carbon monoxide gas separated at the gas separator is fed into the catalytic converter and the catalytic converter is configured to convert the carbon monoxide gas to carbon dioxide gas.

17. The waste processing system of claim 16, wherein the catalytic converter is coupled in fluid communication with a water quencher and the water quencher is configured to cool the carbon dioxide gas to a temperature that is suitable for use in the greenhouse.

18. The waste processing system of claim 16, wherein the waste processing system (i) produces carbon dioxide gas for a greenhouse; (ii) produces steam for electricity production from carbon monoxide gas; and/or (iii) combusts carbon monoxide gas in a gas combustion generator for electricity production.

19. A method using a waste processing system of claim 18, comprising:

receiving a gas comprising at least carbon monoxide and hydrogen;

separating the carbon monoxide from the hydrogen;

converting at least a portion of the carbon monoxide into carbon dioxide;

feeding the carbon dioxide into a greenhouse including plants, wherein the gas is produced by a gas generation process comprising a plasma reactor or a gasification, incineration, or thermal reaction.

* * * * *